Sept. 26, 1950     D. J. PARMESAN     2,523,995
UNION
Filed Aug. 2, 1948
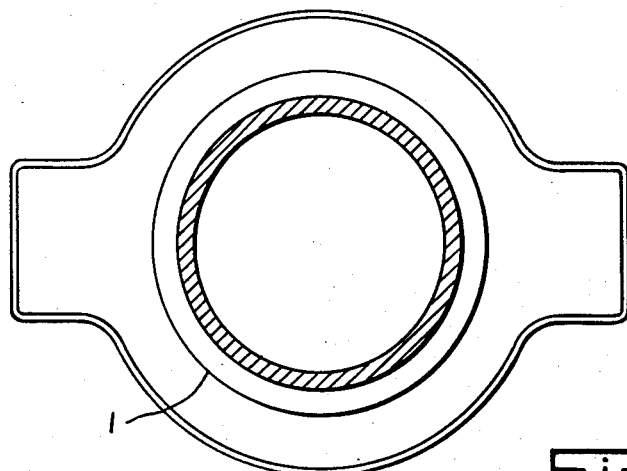
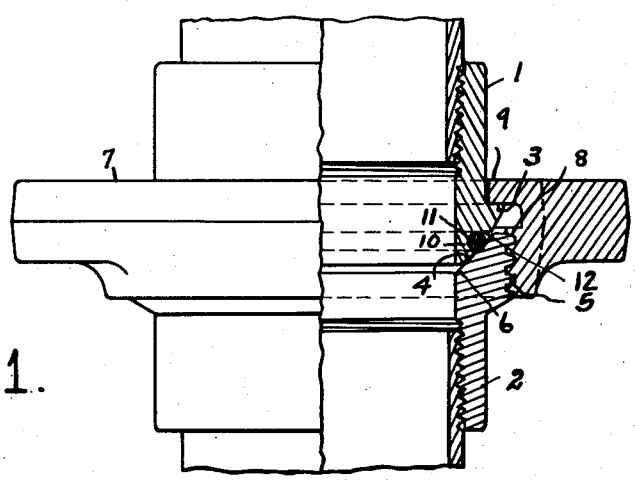
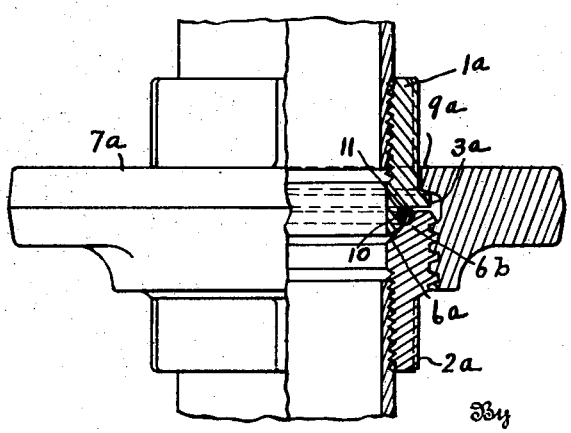
Inventor
Daniel J. Parmesan
By
E. V. Hardway
ATTORNEY.

Patented Sept. 26, 1950

2,523,995

UNITED STATES PATENT OFFICE 2,523,995

UNION

Daniel J. Parmesan, Houston, Tex., assignor to Well Equipment Mfg. Corp., Houston, Tex., a corporation of Texas Application August 2, 1948, Serial No. 41,999

4 Claims. (Cl. 285—122)

This invention relates to a union and has particular relation to that type of union which has been specially designed to prevent leakage, by suction, when the pressure within the pipe connected by the union is lower than the outside pressure.

An object of the invention is to provide a union whereby sections of pipe, or tubing, may be quickly connected or disconnected with a novel type of seal for preventing leakage of fluid, by suction, through the union; and the seal formed between the coupling members is equally efficient when the connected tubular sections are misaligned as when they are in perfect alignment.

While the seal embodied in the union has been specially designed for preventing leakage, by suction, it is also effective to prevent leakage when the pressure within the union is greater than the outside pressure.

It is a further object of the present invention to provide a union of the character described wherein the coupling members provide a metal to metal seal all the way around whether the coupling members are aligned or misaligned, said metal seal being supplemented also by a seal ring which is mounted in a novel manner.

Other objects and advantages will be apparent from the following specification which is illustrated by the accompanying drawings, wherein:

Figure 1 is a side view of the union, partly in section.

Figure 2 is an end view of the union, and

Figure 3 is a side view of another embodiment of the union, shown partly in section.

Referring more particularly to the drawings the numerals 1 and 2 designate, respectively, the coupling members of the union whose outer ends are internally threaded for the connection of sections of pipe thereto, as shown.

The inner end of the coupling member 1 is formed with an external annular shoulder 3 and, beyond said shoulder toward the inner end of said coupling member said member has an external annular bearing surface 4 which is curved toward the inner end of said member all the way around, as clearly shown in Figure 1. The abutting end of the coupling member 2 is outwardly thickened and formed with external coarse threads 5 and has an inside outwardly flared plane annular face 6 which has a line contact all the way around the union with the curved face 4 so as to form a metal to metal contact, or joint, when said coupling members are assembled.

There is a clamp nut 7 having coarse internal threads 8 adapted to intermesh with the threads 5 and also having an internal annular flange 9 which fits closely over the section 1 and which is engageable with the shoulder 3 when the threads are screwed home, to clamp the facing ends of the coupling members in abutting relation.

The inside diameter of the threads 8 is slightly larger than the outside diameter of the shoulder 3 so that the clamp nut 7 may be fitted over the coupling member 1 and the threads 8 screwed onto the threads 5.

Outwardly beyond the line contact, above referred to, the coupling member 1 has an external annular groove 10 all the way around and seated in said groove there is an annular seal ring 11 formed of suitable resilient material and which forms a sealing contact with the face 6 when the coupling members are assembled.

It is to be here noted that the outer side of the groove 10 is extended radially thus forming an annular face 12 which is tangential to said groove but which converges outwardly relative to the face 6. The metal to metal contact will form an annular seal around the union when the parts are assembled and the clamp nut is screwed home and the seal ring 10 is also slightly compressed so that should the metal to metal seal make an imperfect contact the seal ring 11 with prevent leakage.

In case of high pressure within the line and in case the metal seal should develop a leak the pressure will force the seal ring 11 outwardly into the space between the converging faces 6 and 12 thus making a very effective seal in case of high pressure in the line. Likewise in case of low pressure in the line the seal ring 11 will supplement the metal to metal seal and will be deformed by outside pressure so as to form a perfect seal with both coupling members all the way around and will thus be very effective in preventing leakage by suction.

The embodiment illustrated in Figure 3 is substantially the same as that shown in Figure 1. However, in this form the annular shoulder 3a of the coupling member 1a is slightly tapered and the contacting face of the flange 9a is correspondingly tapered so as to form a perfect fit.

The coupling member 2a of the form shown in Figure 3 is substantially the same as that shown in Figure 1.

If desired the flared face 6a may be provided with a shallow groove 6b to receive the seal ring 11 although this is not essential.

In other respects the form shown in Figure 3 is substantially the same as that disclosed in Figure 1.

What I claim is:

1. A union comprising, two tubular coupling members, one having an outwardly curved annular, external face and an external annular groove outwardly of said face, and the other having an internal, flared face forming an annular line contact with said external face inwardly of said groove, a resilient seal ring enclosed in said groove by the flared face and means securing said coupling members together.

2. A union comprising, two tubular coupling members, one having an outwardly curved annular, external face and an external annular groove outwardly of said face, and the other having an internal, frusto-conical shaped face forming an annular line contact with said external face inwardly of said groove to form a metal to metal seal, a resilient seal ring in said groove and in contact with the frusto-conical face and forming a seal between the said coupling members and means securing said coupling members together.

3. A union comprising, two tubular coupling members, one having an outwardly curved annular, external face and an external, annular groove outwardly of said face, and the other coupling member having an internal, frusto-conical face forming an annular line contact with said external face inwardly of said groove, a resilient seal ring in said groove, said coupling members having annular outwardly converging faces, adjacent the outer side of said resilient seal ring and means securing said coupling members together.

4. A union comprising, two tubular coupling members, one having an outwardly curved annular, external face and an external, annular groove outwardly of said face, and the other coupling member having an internal, outwardly flared face forming an annular line contact with said external face to form a seal between said coupling members, a resilient seal ring in said groove, said coupling members having annular faces outwardly of said seal ring and means securing said coupling members together.

DANIEL J. PARMESAN.

REFERENCES CITED

The following references are of record in the file of this patent:

UNITED STATES PATENTS

| Number | Name | Date |
|---|---|---|
| 1,563,836 | Copp | Dec. 1, 1925 |

FOREIGN PATENTS

| Number | Country | Date |
|---|---|---|
| 247,105 | Great Britain | Feb. 11, 1926 |